(12) United States Patent
Chung

(10) Patent No.: US 7,496,545 B2
(45) Date of Patent: Feb. 24, 2009

(54) METHOD OF ADAPTIVE LEARNING THROUGH PATTERN MATCHING

(75) Inventor: Hau Leung Stephen Chung, Hong Kong (CN)

(73) Assignee: Intexact Technologies Limited, Hong Kong (HK)

( * ) Notice: Subject to any disclaimer, the term of this patent is extended or adjusted under 35 U.S.C. 154(b) by 234 days.

(21) Appl. No.: 10/515,013

(22) PCT Filed: May 17, 2004

(86) PCT No.: PCT/CN2004/000492

§ 371 (c)(1),
(2), (4) Date: Nov. 22, 2004

(87) PCT Pub. No.: WO2005/111814

PCT Pub. Date: Nov. 24, 2005

(65) Prior Publication Data

US 2006/0074666 A1     Apr. 6, 2006

(51) Int. Cl.
*G06N 5/00* (2006.01)
(52) U.S. Cl. ............................. 706/6; 706/45

(58) Field of Classification Search ............ 706/6, 706/45, 47, 30; 700/19, 13
See application file for complete search history.

(56) References Cited

U.S. PATENT DOCUMENTS

| 5,117,992 | A | 6/1992 | Simkus, Jr. et al. | |
| 6,292,729 | B2 | 9/2001 | Falck et al. | |
| 6,792,319 | B1 * | 9/2004 | Bilger | 700/13 |
| 6,909,921 | B1 * | 6/2005 | Bilger | 700/19 |
| 6,912,429 | B1 * | 6/2005 | Bilger | 700/19 |

* cited by examiner

*Primary Examiner*—Wilbert L Starks, Jr.
(74) *Attorney, Agent, or Firm*—Buchanan Ingersoll & Rooney PC

(57) ABSTRACT

A method of operating a plurality of electrical and/or electronic devices connected with a data processing apparatus is disclosed as including the steps of (a) detecting occurrence of events of the devices (b) recording data relating to some of said detected events in a database; (c) ordering the recorded events into sequences of events chronologically and/or geographically; (d) comparing a detected event with the sequences of events for finding a matched sequence of events; and (e) performing the remaining events in the matched sequence.

40 Claims, 2 Drawing Sheets

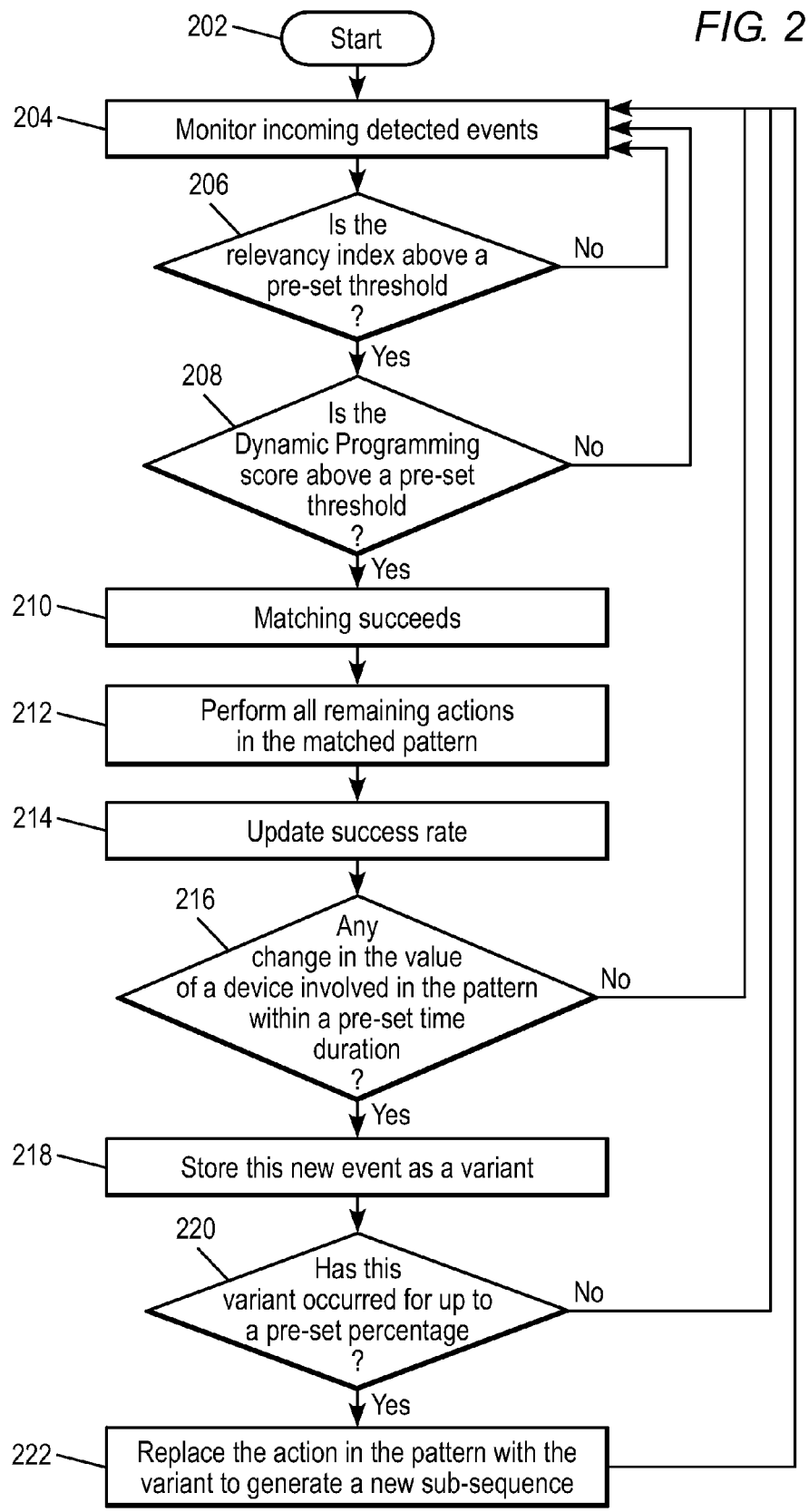

METHOD OF ADAPTIVE LEARNING THROUGH PATTERN MATCHING

Figure 1:
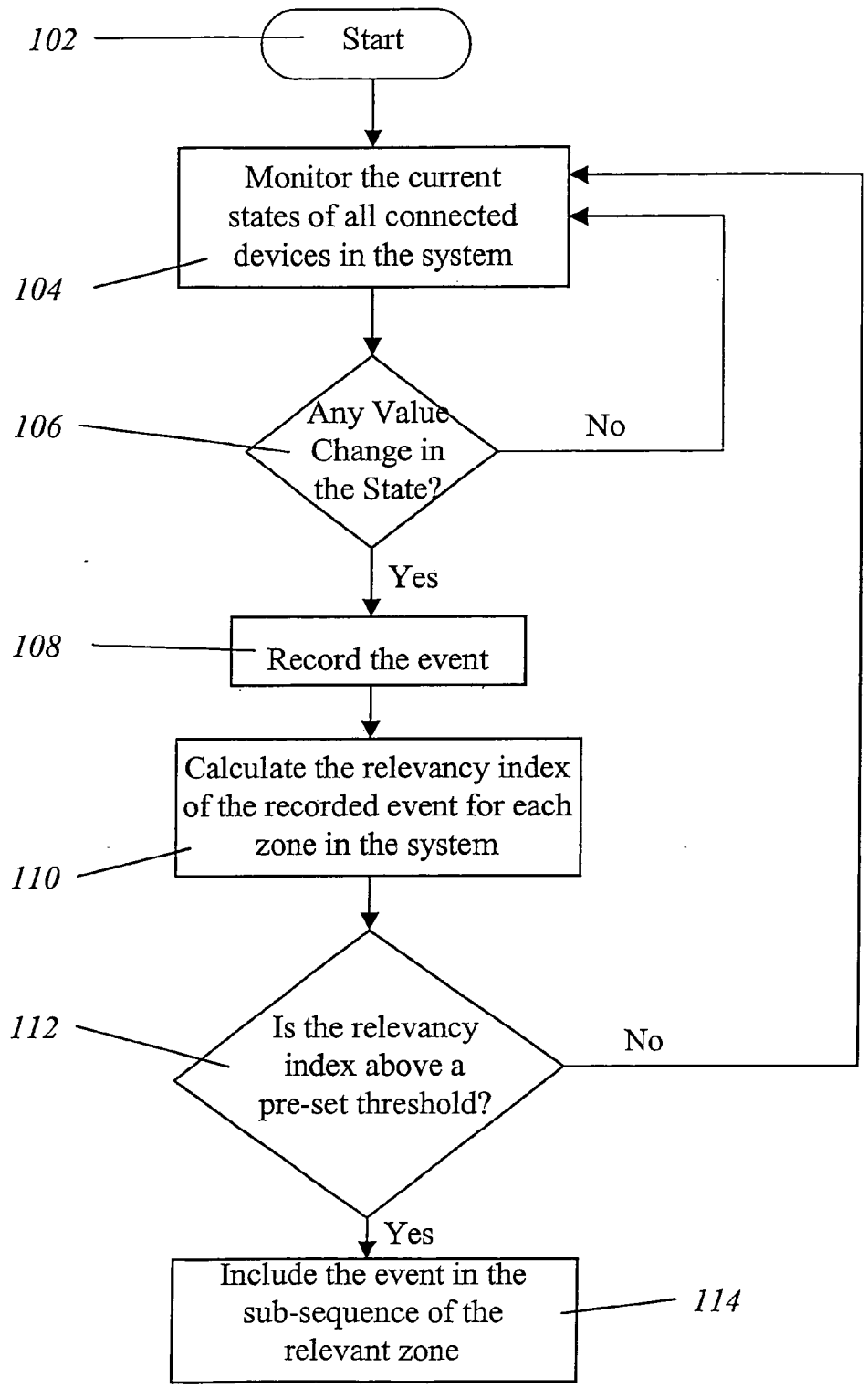

This invention relates to a method of adaptive learning through pattern matching, which may advantageously be implemented in a data processing system, and a system adapted to work such a method.

Such a method and system may be used in a large variety of situations, but for the purpose of illustration, the present invention will herebelow be discussed and explained mainly by reference to a method and system for management of various electrical and/or electronic devices in a premises. It should of course be understood by those skilled in the art that the use of such a method and system is not so limited.

A premises to be managed by a system and a method according to the present invention may be wired up with a number of electrical and/or electronic sensors, detectors and devices, all of which being connected, monitored and controlled by a distributed network of controllers and servers communicating via a digital communications backbone, as detailed in Hong Kong Short-Term Patent No. HK 1052830. These devices, sensors and detectors may include, e.g. motion detectors, window/door contact switches, smoke detectors, light sensors, pressure sensors, sound sensors, etc. All events and occurrences (e.g. tripping of a motion detectors, turning on lights, walking past a corridor, etc.) in the premises are thus detectable by the system via these sensors and detectors and these events are constantly monitored by the system. Specific actions may be initiated and performed by the system upon the detection of an event, which are usually pre-defined or pre-scripted. It is not the purpose of this invention to depict how the actual detectors and sensors and monitoring equipment are to be connected, or how such detection is performed. Suffice to say that, the premises is assumed to have been installed with adequate detection and sensing equipment to enable rapid detection of any event happening in the premises by a management method and system according to the present invention.

According to a first aspect of the present invention, there is provided a method of operating a plurality of electrical and/or electronic devices connected with a data processing apparatus, including the steps of (a) detecting occurrence of events of at least one of said devices; (b) recording data relating to at least some of said detected events in a database; (c) ordering said recorded events into at least one sequence of events; and (d) comparing a detected event with said sequence(s) of events.

According to a second aspect of the present invention, there is provided a system including a plurality of electrical and/or electronic devices connected with a data processing apparatus, including (a) means for detecting occurrence of events of at least one of said devices; (b) means for recording at least some of said detected events in a database; (c) means for ordering said recorded events into at least one sequence of events; and (d) means for comparing a detected event with said sequence(s) of events.

Embodiments of the present invention will now be described, by way of examples only, with reference to the accompanying drawings, in which:

FIG. 1 is a flow chart showing the procedure of event logging of a method and system according to an embodiment of the present invention; and FIG. 2 is a flow chart showing the procedure of pattern matching and pattern revision of a method and system according to an embodiment of the present invention.

The main purpose of the present invention is to introduce intelligence into, e.g. a system for the management of a premises, through a system allowing, and a method including, pattern matching and adaptive learning. In other words, upon detection of an event, the system can actually make intelligent decisions according to its own accumulated experience and learning without having to resort to pre-programmed sequences.

For example, let us assume that a user enters the premises with his/her keycard. The system detects the scanning of the keycard at a card reader and notices the presence of the user. The system then detects that the user turns on the lights in the room, sets the temperature control in the room to 21° C., and puts on a classical music album on the audio system. The premises management system records these events in the history log, and since no particular actions have been pre-programmed based on these events, the system will simply do nothing but continue to observe and record.

Further assume that the user repeats this sequence of actions a few times, each time entering the premises with his/her keycard, turning on the same lights, setting the temperature control to 21° C., and putting on the same classical music album. The present intelligent management system will then infer the causal relationship (a "behavior" of the user) between entering the room with this user's keycard and his/her subsequent actions. The next time this user scans his/her keycard to enter the premises, the system can actually propose to turn on the lights, set climate control to 21° C. and put on music without the user having to lift another finger. The system may automatically perform these actions for the user until the user specifically stops it, or the system may prompt the user for confirmation via speech messages announced on the speakers installed in the room, and obtain the user's confirmation via speech recognition via a microphone installed in the room.

Notice that this sequence of actions has never been pre-programmed or pre-scripted in the present management system. It was never envisioned by the system's programmers and designers; instead, the present intelligent management system infers such sequences and does its own programming. The resulting benefit is that a typical user will consider the premises to have "intelligence", and the physical benefits are added convenience and reduction in repetitive, manual labor.

In order to implement such an adaptive-learning premises management method and system, the system must include three crucial modules, each invoked at a different time and in different sequence. The three modules are:

Event Logging;

Pattern Recognition; and

Pattern Matching.

Event Logging

First and foremost, in order for an intelligent premises management system according to the present invention to be able to infer behavior, there must be adequate data. In the current implementation, all sensing and detecting devices connected to the system have respective state values, and the change of any state value of any of these sensing and detecting devices is counted as an event. For example, typical state values are as shown in Table 1 below:

TABLE 1

| Device | State Value | Examples |
|---|---|---|
| Light sensor | Light intensity | 0%, 50%, 100% |
| Pressure sensor | Load pressure | 100 psi |
| Motion detector | Detection contact | Open, Closed |

A system according to the present invention constantly monitors all the current state values of each connected device, and when the value of any state changes, it is automatically recorded as an event. At least some the following information will also be recorded with the event:
- time of event;
- identity of the device;
- state values: previous and new; and
- any user identity associated with the event, e.g. keycard number mapped to a user's identity when the event is scanning of a keycard.

A most important piece of information is the time of occurrence of the event. The intelligent management system sorts all recorded events by time stamp order to create an event sequence. It then partitions the sequence based on geographical relevancy and yield sub-sequences that are more localized and more manageable.

For example, let us assume the premises consists of two rooms connected by a common corridor. Events generated by devices in one room are less relevant to events generated by devices in the other room, but events generated in the corridor are relevant to both rooms. This is because, in premises management, events that happen are typically localized geographically: when two events happen at the same time at two geographically diverse places, chances are much higher that two different users are responsible for mutually independent actions.

Thus, the intelligent management system keeps a crosstab table with rows and columns, both consisting of different geographical zones in the premises. The table is filled with relevancy coefficients, between 0 and 1, with 0 meaning no relevancy at all, and 1 means total relevancy. Table 2 below shows exemplary relevancy coefficients of a premises with five zones, namely Zone A, Zone B, Zone C, Zone D and Zone E.

TABLE 2

| Zones | A | B | C | D | E |
|---|---|---|---|---|---|
| A | 1 | 0.5 | 0.3 | 1 | 0.9 |
| B | 0.5 | 1 | 0.7 | 0.1 | 0.9 |
| C | 0.4 | 0.2 | 1 | 0 | 0 |
| D | 0.8 | 0.2 | 0 | 1 | 0.1 |
| E | 0.9 | 0.9 | 0 | 0.1 | 1 |

These relevancy coefficients mean that, for example, an event triggered by a device in Zone B will have a relevancy of 0.7 (high relevancy) to Zone C, but a device triggered in Zone C will have a relevancy of only 0.2 (low relevancy) to Zone B. As can be seen here, the relevancy coefficients can be made asymmetric, so that more flexibility can be obtained when designing zonal structures.

For each event recorded, its relevancy coefficient relative to each zone is multiplied by the magnitude of change in the state value for the event, as well as a pre-defined coefficient for that device (usually a number for magnitude scaling purposes) to arrive at the final relevancy index of this event for the zone in question. As such, each device should has its own coefficient.

For example, let us assume that a temperature sensor yields the current temperature of the environment, and that the pre-defined coefficient for this sensor is 0.5, and its relevancy coefficient relative to Zone A is 0.7. Let us further assume that the temperature changes from 21° C. to 25° C. The state value of this sensor will thus change from 21 to 25. The final relevancy index of this event for Zone A will thus be:

Magnitude of change×Pre-defined coefficient×Relevancy coefficient=|25−21|×0.5×0.7=1.4

The total event sequence is then sub-divided into sub-sequences, one for each zone in the premises. The events included in each zone's sub-sequence are those events with relevancy indices exceeding a pre-defined threshold value. Therefore, although there is only one event sub-sequence for each zone, any one event may be included in none, one, or more such sub-sequences, indicating that the event is of interest to nobody, to only one zone, or to more than one zone respectively. The threshold may be set to zero to allow all events to be relevant to all zones, regardless of where the event is recorded.

Following on from the above example of a temperature sensor, and using the same relative relevancy coefficients as shown in Table 2 above, the relevancy indices of this event for Zones A to E are thus as follows:
- Zone A=1.4
- Zone B=0.7
- Zone C=0.42
- Zone D=1.4
- Zone E=1.26

Further assume that the threshold for including this event in a particular zone's event subsequences is 1.0. In this case, this event will be included in the subsequences for Zones A, D and E, but not in those for Zones B or C. Of course, if the threshold is set to zero, then all events will be included in all zones.

It is also the case that, in typical premises management scenarios, events happening over a long period of time are less relevant to each other, as compared with events happening within a short time from each other. For example, a light being turned on now has no reasonable relevancy to another light being turned on one week later, but is very relevant to another light being turned on immediately after. This is because human behavior typically occurs in bursts of actions, one closely after another. For this reason, the management system will automatically discard events that are older than a pre-defined age (e.g. one week) in order to conserve computing and storage resources. This threshold age may be set to infinity, so that the system will always consider all events recorded in its database.

Pattern Recognition

The learning process is largely that of pattern recognition. A pattern is defined as a sequence of events that has a tendency to repeat, either in its entirety or in sequences that closely resemble the original pattern. The entire process of pattern recognition detects regularities in behavior, and these regularities enable the management system to "program itself" to perform some regular activities on behalf of the user, as a result creating convenience and the perception of intelligence.

Recognizing pattern in a time-based sequence is a well-studied computing problem. While recognition of exact patterns (i.e., all sequences of events must be exactly the same during each repetition) is easy to achieve, heuristic (i.e. probabilistic) pattern recognition is a much more involved problem.

An important input variable to any pattern recognition or pattern matching algorithm is typically the length of the pattern to be recognized, with computing resource requirements going up radically with increasing pattern lengths, sometimes exponentially for certain algorithms. The length of a pattern in the context of this invention is the number of events in a zonal sub-sequence, with the event itself acting as a basic unit in the "alphabet" for the algorithm.

The current implementation makes use of a mixture of Dynamic Programming and Gibbs Sampling techniques for pattern matching purposes. The standard Gibbs Sampling algorithm is slightly modified to allow patterns of variable lengths, but with events happening within a pre-defined "time window." This decision is based on the fact that human behavior occurs in bursts of activity; therefore, events occurring together within, say, 30 seconds or 1 minute, have much higher chances of being parts of a coherent whole than events happening 2 hours apart. The "time window" moves through the events sub-sequence for each zone instead of the standard-length sub-string in the standard Gibbs Sampling algorithm. In reality, for a time-window of 15 to 30 seconds, it is rare for the number of relevant events within the time window to exceed 20, and most of the time only a few events are within a single time window. This modification helps reduce the computing resource requirements significantly. Setting the time window wider will allow more "global" type of behavior recognition, at the cost of a dramatic increase in computing resources. It is usually necessary to strike a balance between the "globalness" of behaviors detected and the amount of resources needed to operate the system in real-time.

Dynamic Programming is a heuristic search technique typically used for detecting missing information in sequences when matched against a pattern. It can also be used for detecting swaps and slight variations in ordering. The standard Gibbs Sampling comparison operation is replaced by a more involved Dynamic Programming operation so that event sequences that resemble each other and differ only slightly in ordering are counted as a successful match. The output of a Dynamic Programming operation includes a numeric score that enables the use of a pre-defined threshold to fine tune the pattern recognition algorithm. Setting a low threshold will enable more different patterns to be recognized, while setting a high threshold will yield fewer patterns, although such patterns resemble each other much more closely.

An optional modification to the system is to only consider recognizing a pattern when the time of the event or the changes of state values of certain devices are within a pre-set range. For example, certain patterns are relevant only at certain times of day (e.g. turning on lights only when it is night time), or days of week (e.g. watering the plants only twice a week), or only when certain conditions are true (e.g. turning on lights only when it is dark).

In addition to yielding a pattern, the Gibbs Sampling technique also yields a score for the pattern within the sequence. Again, a threshold value may be used for rejecting patterns that are too far off from each other, and to include as valid only those patterns with scores that are above the threshold.

Since pattern recognition always operates on the sub-sequence of each zone, the patterns recognized are always tied to a particular zone and are stored in the system's pattern database for future matching purposes.

Pattern Matching

Armed with a complete database of patterns recognized from past events, the intelligent management system according to the present invention will constantly monitor the incoming stream of detected events to see whether they match the beginning of one of the patterns stored in the database.

Again, any new event is screened through relevancy calculations, with irrelevant events, i.e. events with low relevancy indices, discarded. Dynamic Programming techniques are then employed to compare any new event with the beginning of corresponding patterns stored relative to the zone in question. The result of comparison is considered to be positive, and a pattern is thus to be matched, if its Dynamic Programming score exceeds a pre-defined threshold.

With each pattern is also kept a respective success rate. If the beginning of a pattern is successfully matched with a new event, then the system may automatically perform all the remaining actions in the pattern or inform the user via speech generation for confirmation. Upon confirmation by the user, e.g. via speech recognition, the system will also update the success rate based on the response of the user. If the user confirms the system's suggestion, the success rate will be increased; whereas if the user rejects the system's suggestion, the success rate will be decreased.

With each pattern is also kept the last matched date, and patterns with a last matched date older than a pre-defined age, i.e. patterns which have not been successfully matched for a pre-defined period of time, can be pruned by the system to conserve database storage resources.

An important adaptive technique to enhance the learning capabilities of the system is to allow the system to dynamically alter the stored patterns based on actual occurrences. For example, suppose a pattern stored in the database is as follows:

Zone: John's bedroom
Pattern: Keycard scanner detects John's keycard
    Unlock bedroom door
    Turn on bedroom lights
    Turn on audio system
    Put on song A Once John's keycard is detected by the system, the pattern is matched and the system will automatically, or upon confirmation, unlock the door, turn on lights and put on song A for John.

However as behavior changes, it is likely that John may grow tired of song A and now wish to listen to song B. The system constantly monitors the state values of all the devices within a certain period of time (a threshold) after execution of the pattern. If, for example, John immediately puts on song B after the system performs the actions in the pattern, it will be stored as a variation to the pattern in the database. The same is true for other devices involved in the pattern.

If the variation to the pattern occurs with great predictability, e.g. the occurrence of this variation during the next 5 times is over 80%, then the system will replace the particular action in the pattern with this variation. In other words, if John continues to put on song B within, say, 1 minute of entering his bedroom, after 5 times of doing so the system will rewrite the pattern as follows:

Zone: John's bedroom
Pattern: Keycard scanner detects John's keycard
    Unlock bedroom door
    Turn on bedroom lights
    Turn on audio system
    Put on song B Next time John enters his bedroom with his keycard, the system will, after effecting all other actions in this pattern, automatically put on song B. This iteration is adaptive learning and is necessary to prevent the patterns stored in the system from becoming stale.

It can be seen that an adaptive learning, intelligent premise management system exhibits a perception of intelligence with its ability to recognize human behavior (i.e. patterns) and to offer to automate those activities that are repetitive. It also adapts to on-going runs by learning new variations and dynamically rewriting the database of recognized behavior.

The steps and procedure for the operation of a method and system according to the present invention is shown in the flow charts in FIGS. 1 and 2. As shown in FIG. 1, when the system starts operation (Step 102), it will monitor the current states of all electronic and/or electrical devices connected to the system (Step 104), in particular to check if there has been any change in the value of the state of such devices (Step 106). Once a value change occurs, the event will be recorded or "logged" (Step 108), and its relevancy index for each zone in the system calculated (Step 110). The system will then check whether such calculated relevancy indices are above a pre-set threshold for each respective zone (Step 112). If not, the system will keep on monitoring the current states of all electronic and/or electrical devices connected to the system (Step 104). If, on the other hand, there is any calculated relevancy index which is above the pre-set threshold for a particular zone, the event in question will be included in the sub-sequence of that particular zone (Step 114).

Turning now to FIG. 2, when the pattern matching function of the system starts (Step 202), which in fact operates simultaneously with the event logging and pattern recognition functions discussed above, the system will monitor all incoming detected events (Step 204). The system will check whether the calculated relevancy indices of such detected events are above a pre-set threshold (Step 206). Once a relevancy index of a detected event exceeds the pre-set threshold, the system will then determine whether the Dynamic Programming score of this event is above another pre-set threshold (Step 208). If not, the system will continue with the monitoring of incoming detected events (Step 204). If, on the other hand, the Dynamic Programming score of this event is above the other pre-set threshold, matching is considered to succeed (Step 210), the system will proceed to perform all remaining actions in the matched pattern (Step 212). As an alternative, and as will be further discussed below, the system may be configured to seek confirmation from the user as to whether the remaining actions in the matched pattern are to be performed. The success rate will also be updated (Step 214).

In any case, the system will then go on to check whether there is any change in the value of a device involved in the pattern within a pre-set time duration (Step 216). If not, the system will continue with the monitoring of incoming detected events (Step 204). If, on the other hand, the answer is in the affirmative, this event will be stored as a variant (Step 218). The system will then check whether this variant has occurred for up to a pre-set percentage, e.g. at least 80%, i.e. four times in out of the last five times when the pattern was executed (Step 220). If not, the system will continue with the monitoring of incoming detected events (Step 204). If, on the other hand, the answer to this is in the affirmative, the particular action in the pattern will be replaced by the variant to generate a new sub-sequence, for future execution (Step 222).

As stated and discussed above, such a method of adaptive learning through pattern matching, and a system adapted to work such a method, may be used in a large variety of applications. For example, the current invention may be implemented in a vehicle of transport, e.g. an automobile, to give a perception that the vehicle has built-in "intelligence".

A modern automobile contains a large number of electronic and electrical devices, some for implementing certain functions (e.g. fuel injection control), some for monitoring (e.g. low-petrol sensor, speedometer), and some others for automation (e.g. window motors, seat position adjustment motors), etc. In an automobile including a system according to the present invention, and thus adapted to carry out the method according to the present invention, all such electronic and electrical devices are constantly monitored by a central data processing system to detect any and all state changes. For this particular example, we will focus on the following devices in Table 3 below for illustration purposes:

TABLE 3

| Device | State Value | Examples |
| --- | --- | --- |
| Radio frequency (RF) receiver | Security Key | Personal Key |
| Door lock | Lock State | Unlocked |
| Seat position | Position, Angle | +50 mm, +15° |
| Rear view mirror | Alpha, Beta | +5°, −10° |
| Climate Control | Temperature, Fan | 21° C., Speed 3 |
| Radio | Channel, Volume | Channel 4, 3 |

In an automotive environment, there is practically only one zone, which covers the whole vehicle. Therefore, all relevancy coefficients are set to 1.

Assuming that this automobile has an RF based security key which, upon actuation, wirelessly transmits a security code to the RF receiver in the automobile. When the security code is authenticated by the security system in the automobile, the door is unlocked and all these events will be logged in the adaptive learning system in the automobile. Let us assume then that the driver, upon entering the automobile, immediately adjusts the seat and rear view mirror positions to suit his physical built, turns on the radio and tunes it to Channel 2, and sets the climate control to 19° C. All such events (changes in the states of the electronic and/or electrical devices in the automobile) will, again, be logged by the system. Let us assume further that this same driver, subsequently, performs the same sequence of actions three more times.

In the central data processing unit of the automobile, a master program is set to run continuously, its task being to perform pattern recognition based on logged event sequences, in the manner as discussed above. Let us assume that, after running a built-in Gibbs Sampling-based pattern extractor program, the pattern as shown in Table 4 below is found with a score exceeding the pre-defined minimum threshold:

TABLE 4

| Device | State Changed | New Value |
| --- | --- | --- |
| RF receiver | Security Key | Driver A |
| Door lock | Locked State | Unlocked |
| Seat position | Position | +15 mm |
| Seat Position | Angle | +5° |
| Rear view mirror | Alpha angle | +10° |
| Rear view mirror | Beta angle | −10° |
| Radio | Power | On |
| Radio | Channel | 2 |
| Radio | Volume | 8 |
| Climate control | Temperature | 19° C. |
| Climate control | Fan | Speed 5 |

When the driver, say Driver A, unlocks the door of the automobile one more time with his wireless security key, changes in the RF receiver's state will be logged, and this information will be used by the pattern matcher in the automobile system to match against all patterns that are found and stored. In this case, the RF receiver event will successfully match the beginning of the pattern shown in Table 4 above, and the system will start to automatically execute the remaining actions in the above pattern.

Alternatively, the system in the automobile may, after unlocking of the door, seek the driver's confirmation whether or not to continue to execute the remaining actions in the pattern. Once the driver's confirmation is received, the automobile will immediately adjust the seat position, rear view mirror position, turn on the radio, tune to the correct channel, and set the climate control, to the preferred setting and pattern. It can be seen that the only action that the Driver A has taken is unlocking of the door of the automobile by his security key, whereas the rest of the actions are all undertaken automatically by the system in the automobile, thus yielding the perception of "intelligence".

Let us assume that the Driver A subsequently immediately changes the radio channel to 3, and turns down the volume to 6. These two changes will be logged by the system and stored as a variation to the pattern. If Driver A subsequently performs the same changes several times immediately after execution of the actions stored in the pattern, the pattern will be "re-written" and the values in this variation will overwrite the original values in the pattern. The next time this pattern is executed for Driver A, the radio will be tuned to Channel 3, and its volume well be set to 6 instead of 8.

A method according to the present invention may be implemented, and a system according to the present invention may be adopted, in the management of a computer network, e.g. to implement self-diagnosis and self-recovery functions, as illustrated below.

A computer network is formed by "nodes" linked with one another into a topology. Each node represents a resource on the network, be it a computer (with data processing resources), a printer (with printing resources), a facsimile machine (with faxing resources), etc. Each node has a number of status variables, indicating its "health" and resource level. For this particular example, we will focus on the following devices in Table 5 below for illustration purposes:

TABLE 5

| Device | Location | State Value | Examples |
|---|---|---|---|
| Computer A | Rack A | CPU available | 50% |
| Computer B | Rack B | CPU available | 25% |
| Computer C | Rack C | CPU available | 90% |
| Printer A | Building A | Paper | Full |
| Printer B | Building B | Paper | 20% |
| Printer C | Building C | Paper | 60% |

Application of a method and a system according to this invention to network management allows the system to "learn" the remedial actions of an experienced human operator, store it for later use, and automatically repeat those actions when the same situation arises. For example, when Printer A is out of paper (Paper=0%), a human operator may temporarily redirect Printer A's spool queue to Printer B with a notice to all users, until the paper supply of Printer A is replenished, after which the spool queue may be re-directed. Programs requiring CPU computing resources may be allocated to different computers based on a load-balancing criteria, and these programs may be re-allocated to other computers when the current computers are down or simply unavailable (CPU available=0%). All these events may be "observed", logged and stored by the system. When similar situations arise in the future, these patterns can be matched and the remedial actions automatically performed by the computer system, thus allowing the system to self-recover from faults that may otherwise human intervention, e.g. changing paper, or redirecting the print queue at 3 o'clock in the morning.

In this example, where absolute values are more meaningful than the magnitude of changes, the magnitude of changes is replaced by the absolute value of each state variable. Relevancy coefficients and indices are highly important in this example, in contrast with the automotive example above, because a computer network may span large geographical distances. For instance, Building A in which Printer A is located may be very close to Building B in which Printer B is located, whereas Building C in which Printer C is located may be at the end of the campus, which is very far from Building A and Building B. Thus, while it may be meaningful to re-allocate Printer A or B's spool queues to each other, it is not so for Printer C because one cannot expect users to walk across the entire campus to pick up a print-out.

On the other hand, Computer A and Computer B may be of different types that cannot inter-operate, whereas Computer C may be of the same or interoperable type as Computer A, and since these three computers are connected with one another in the network, their geographical distances are irrelevant. Thus, Computer A and Computer C may be relevant to each other, whereas Computer B is relevant to neither of the other two computers. Table 6 below shows exemplary relevancy coefficients, in terms of the locations of the above devices:

TABLE 6

| Zones | Building A | Building B | Building C | Rack A | Rack B | Rack C |
|---|---|---|---|---|---|---|
| Building A | 1 | 1 | 0 | 0 | 0 | 0 |
| Building B | 1 | 1 | 0 | 0 | 0 | 0 |
| Building C | 0 | 0 | 1 | 0 | 0 | 0 |
| Rack A | 0 | 0 | 0 | 1 | 0 | 1 |
| Rack B | 0 | 0 | 0 | 0 | 1 | 0 |
| Rack C | 0 | 0 | 0 | 1 | 0 | 1 |

With this set of relevancy coefficients, event changes in Building C (in which Printer C is located) will not be included in the subsequences in Building A and Building B. Similarly, event changes in Rack B (at which Computer B is located) will not be included in the subsequences in Rack A and Rack C. Therefore, a large network, say with hundreds of nodes, may be separated into logical segments that makes it easier to manage.

The invention claimed is:

1. A method for adaptively managing a location including a plurality of electrical and/or electronic devices communicatively connected with a data processing apparatus, the method including the steps of:
   (a) receiving, at the data processing apparatus, information indicating occurrences of events of at least one of said devices, wherein an event is a change in state of a respective one of said devices;
   (b) recording data relating to at least some of said detected events in a computer-readable database;
   (c) ordering said recorded data of detected events into at least one sequence of detected events;
   (d) comparing the sequence of detected events with a sequence of past events stored in said database; and
   (e) modifying the stored sequence of past events based on the comparison.

2. The method according to claim 1, wherein step (d) includes:
comparing the sequence of detected events with a respective beginning event in said sequence of past events.

3. The method according to claim 1, including:
(f) controlling said electrical and/or electronic devices to perform remaining events in said sequence whose result of said comparison is positive.

4. The method according to claim 3, including:
(g) receiving a user's confirmation before carrying out said step (f).

5. The method according to claim 4, including:
(h) updating the rate of success of matching of said sequence of detected events in response to receiving said user's confirmation.

6. The method according to claim 3, further characterized in that, in step (f), the result of comparison of the sequence of detected events is positive if a Dynamic Programming score exceeds a first pre-defined value.

7. The method according to claim 1, further characterized in that in said step (b), data of a detected event is recorded in said database if a relevancy index related to said event exceeds a second pre-defined value.

8. The method according to claim 7, further characterized in that said relevancy index is arrived at least partly on the basis of the identity of the device at which said event occurs.

9. The method according to claim 7, further characterized in that said relevancy index is arrived at least partly on the basis of the magnitude of the changes in values of said device.

10. The method according to claim 7, further characterized in that said relevancy index is arrived at least partly on the basis of a third pre-defined value assigned to each respective device.

11. The method according to claim 1, including:
(i) removing from said database sequences of past events not having positive comparison result for a pre-defined period of time.

12. The method according to claim 1, further characterized in that said data relating to at least some of said detected events recorded in said database include, identity of said devices at which said events occur, magnitude of changes in state values and/or user identity.

13. The method according to claim 1, further characterized in that, in said step (c), said recorded events are ordered into said at least one sequence of events at least in chronological order.

14. The method according to claim 1, further characterized in that, in said step (c), said recorded events are ordered into said at least one sequence of events at least geographically.

15. The method according to claim 1, including:
(k) altering said sequence of past events by replacing an event in said sequence by another detected event.

16. The method according to claim 15, further characterized in that said step (k) is carried out when said another event has been performed for at least a predetermined percentage of time of during execution of said sequence of events.

17. The method according to claim 1, further characterized in operating a plurality of electrical and/or electronic devices in a premises.

18. The method according to claim 1, further characterized in operating a plurality of electrical and/or electronic devices in a vehicle of transport.

19. The method according to claim 18, further characterized in that said vehicle of transport is an automobile.

20. The method according to claim 1, further characterized in operating a plurality of electrical and/or electronic devices in a computer network.

21. A system for adaptively managing a location including a plurality of electrical and/or electronic devices communicatively connected with a data processing apparatus, including:
(a) means for receiving information indicating occurrences of events of at least one of said devices, wherein an event is a change in state of a respective one of said devices;
(b) means for recording at least some of said detected events in a computer-readable database;
(c) means for ordering said recorded data of detected events into at least one sequence of detected events; and
(d) means for comparing the sequence of detected events with a sequence of past events stored in said database; and
(e) modifying the stored sequence of past events based on the comparison.

22. The system according to claim 21, further characterized in that said comparing means is adapted to compare said sequence of detected events with a respective beginning event in said sequence of past events.

23. The system according to claim 21, including:
means for controlling said electrical and/or electronic devices to perform remaining events in said sequence whose result of said comparison is positive.

24. The system according to claim 23, including:
means for receiving a user's confirmation before controlling said electrical and/or electronic devices to perform remaining events in said sequence whose result of said comparison is positive.

25. The system according to claim 24, including:
means for updating the rate of success of matching of said sequence of detected events upon receipt of said user's confirmation.

26. The system according to claim 23, further characterized in that said comparing means is adapted to carry out a Dynamic Programming calculation.

27. The system according to claim 23, further characterized in that said vehicle of transport is an automobile.

28. The system according to claim 21, including:
means for calculating a relevancy index related to each detected event.

29. The system according to claim 28, further characterized in that said relevancy index is arrived at least partly on the basis of the identity of the device at which said event occurs.

30. The system according to claim 28, further characterized in that said relevancy index is arrived at least partly on the basis of the magnitude of the changes in values of said device.

31. The system according to claim 28, further characterized in that said relevancy index is arrived at least partly on the basis of a pre-defined value assigned to each respective device.

32. The system according to claim 21, including:
means for removing from said database sequences of events not having positive comparison result for a pre-defined period of time.

33. The system according to claim 21, further characterized in that said recording means is adapted to record the time of occurrence of said events, identity of said devices at which said events occur, magnitude of changes in state values and/or user identity.

34. The system according to claim 21, further characterized in that said ordering means is adapted to order said recorded events into said at least one sequence of events at least in chronological order.

35. The system according to claim 21, further characterized in that said ordering means is adapted to order said recorded events into said at least one sequence of events at least geographically.

36. The system according to claim 21, further characterized in including means for altering a sequence of events by replacing an event in said sequence by another event.

37. The system according to claim 36, further characterized in that said altering means is adapted to alter a sequence of events by replacing an event in said sequence by said another event when said another event has been performed for at least a predetermined percentage of time of during execution of said sequence of events.

38. The system according to claim 21, further characterized in that said system is adapted to operate a plurality of electrical and/or electronic devices in a premises.

39. The system according to claim 21, further characterized in that said system is adapted to operate a plurality of electrical and/or electronic devices in a vehicle of transport.

40. The method according to claim 21, further characterized in that said system is adapted to operate a plurality of electrical and/or electronic devices in a computer network.

* * * * *